April 14, 1970     A. M. WILLIAMS, JR     3,505,904
CHAIN DRIVE TRANSFER CASE

Filed June 17, 1968     3 Sheets-Sheet 2

INVENTOR.
ARTHUR MURRAY WILLIAMS, JR.
BY
Richard W. Law
ATTORNEY

April 14, 1970  A. M. WILLIAMS, JR  3,505,904
CHAIN DRIVE TRANSFER CASE

Filed June 17, 1968  3 Sheets-Sheet 3

INVENTOR.
ARTHUR MURRAY WILLIAMS, JR.
BY
Richard D. Law
ATTORNEY

United States Patent Office

3,505,904
Patented Apr. 14, 1970

3,505,904
CHAIN DRIVE TRANSFER CASE
Arthur Murray Williams, Jr., Lakewood, Colo., assignor, by mesne assignments, to The American-Coleman Company, Littleton, Colo., a corporation of Delaware
Filed June 17, 1968, Ser. No. 737,659
Int. Cl. F16h 1/38, 37/08, 57/10
U.S. Cl. 74—665      9 Claims

ABSTRACT OF THE DISCLOSURE

A transfer case includes a straight through drive shaft having a power input from an engine to an input differential and a power output leading to a rear differential of the vehicle, and a differential driven sprocket on the drive shaft drives a high speed chain mounted over another sprocket on an offset shaft for driving a front differential of the vehicle. Torque is split on the drive shaft instead of going through a power train, and a plurality of chain driven output shafts may be provided in the transfer case. A brake on one output shaft provides a positive action parking brake.

---

Vehicles with multiple drive wheels require the use of a transfer case to apply power to one or more rear differentials and one or more front differentials. Each differential, of course, drives a pair of drive wheels on an axle. In smaller vehicles four drive wheels are employed, usually a set of non-steerable rear drive wheels and a set of steerable front drive wheels. Some vehicles have steerable front and rear drive wheels. On other vehicles six or more drive wheels may be used, and generally these include two sets of rear drive wheels which are non-steering and one set of front steering wheels. A transfer case is required in the power output of an engine to split the torque of the propeller shaft between the rear differential and the front differential. Conventional transfer cases utilize a gear train with the power input shaft normally entering the top of the case and the power output to the rear differential and to the front differential coming off the bottom of the case. Other arrangements have a power output shaft at the opposite end of the housing for a power take off. Such systems require power take off pumps to lubricate top bearings because the gear train is in neutral and cannot rely on gears to throw lubricant in the upper part of the transfer case. With two speed transfer cases it is usually necessary to stop the vehicle to engage the gears which operate the output shafts leading to the front axle and rear, since expensive syncromesh gears are not economically feasible. Further the geometry is such that it is not possible to offset the power take off for the front axle, therefore, the propeller shaft from the transfer case to the front differential is usually at an angle.

According to the present invention I have provided a transfer case with a high speed chain drive having an input differential which splits the torque directly in the input shaft rather than going through a power gear train in the transfer case. The transfer case may be provided with a plurality of output shafts, and in one case an output shaft is provided with a parking brake which provides a positive locking action of the engine and the wheels for parking. The transfer case may be provided with a cylinder power differential lock for locking the transfer case chain into all wheel drive position over riding the differentials. A simplified welded case may be used for the transfer case instead of conventional cast cases, which increases the speed of production, reducing costs by the simplifying of the actual manufacture of the cases. By providing a pressure lubrication system, lubricant is force fed to all of the moving parts above the lubricant sump insuring positive lubrication of the moving parts. The transfer case is readily adaptable to two speed rear axles to thereby obtain a three speed unit and is easily changed to provide different centers for input and output shafts.

Included among the objects and advantages of the present invention is a transfer case utilizing a high speed chain drive.

Another object of the invention is to provide a chain drive transfer case with an input differential on the input power shaft to divide the torque directly on the input shaft instead of going through a gear power train.

Another object of the invention is to provide a transfer case with a positive lubricant feed to the moving parts of the transfer case above an oil sump.

A still further object of the invention is to provide a transfer case with an input differential on the input shaft and an offset output shaft for front axles.

A still further object of the invention is to provide a transfer case arranged with an output shaft having a braking mechanism for providing a parking brake for the vehicle on which it is mounted.

A still further object of the invention is to provide a transfer case with two or more speeds providing a still different range of speed for the vehicle in which it is mounted.

Yet another object of the invention is to provide a transfer case having essentially standard parts which may be readily mounted in different configurations of the housings to give required centers and output shafts for a particular vehicle.

These and other objects and advantages of the present invention may be readily ascertained by referring to the following description of the appended illustrations in which:

FIG. 4 is a schematic arrangement of one application of a transfer case according to the invention mounted between an engine and a pair of rear drive wheels with a power take off extending to a front differential for front drive axle.

Figure 1:
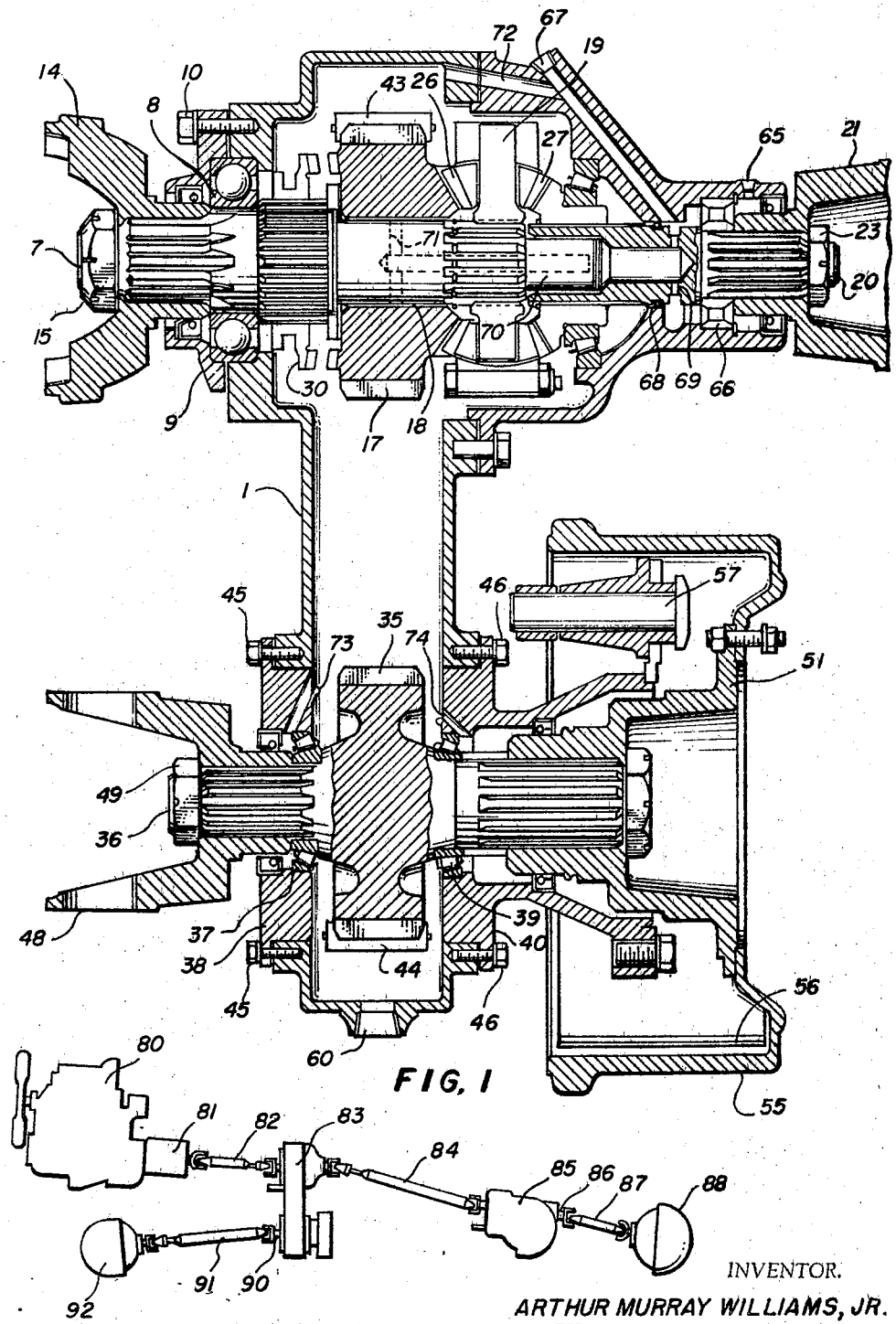
FIG. 1 is a cross-sectional view of one form of transfer case, according to the invention, having output shafts for rear and front differentials and a parking brake arrangement.
Figure 2:
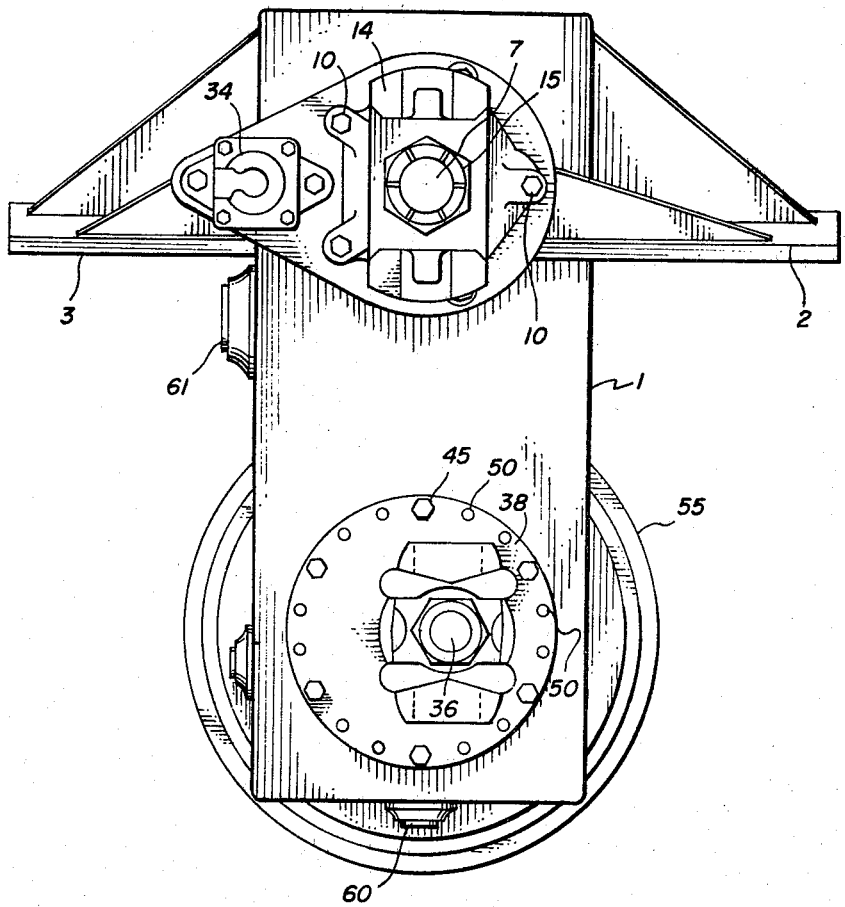
FIG. 2 is a front elevational view of the transfer case of FIG. 1.
Figure 3:
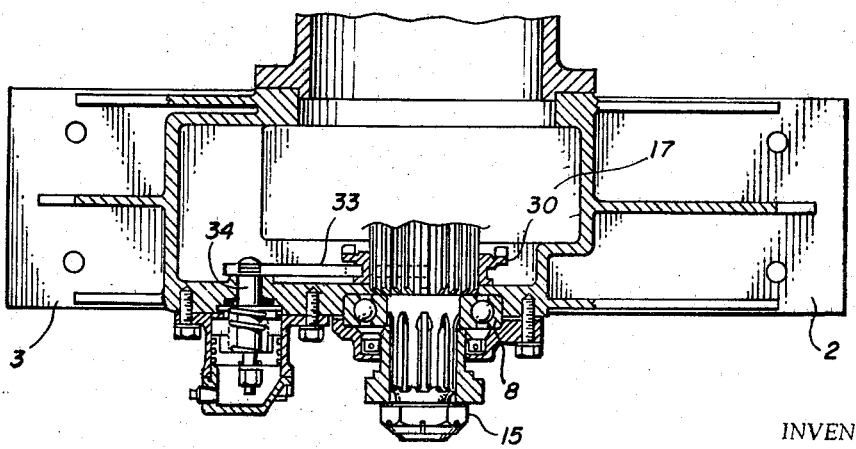
FIG. 3 is a partial cross-sectional top plan view thereof.

In the device illustrated in FIGS. 1–3, a rectangular transfer case or housing 1 is provided with reinforced depending arms 2 and 3 extending outwardly from opposite sides thereof, providing means for mounting the transfer case on the frame of the vehicle. In a simple form the transfer case is merely a rectangular housing made of channels welded together with the ends having welded dovers thereon providing a very simple rectangular box construction. Also, a channel with a sheet welded to the legs and end covers is another simple construction. The openings required for the various parts are very easily bored into the housing, and where required the bores may be threaded to accommodate plugs, bolts or the like or where necessary to accommodate studs or the like. An input shaft 7 is mounted adjacent one end in a bearing set 8 secured to a cover 9 which is bolted by means of bolts 10 to the housing 1. An end yoke 14 is splined to the end of the shaft and retained in position by nut 15 threaded on the end of the shaft. Mounted for free rotation on the shaft is a sprocket 17 on a bushing 18 between the shaft and the sprocket. An input differential assembly 19 is mounted on the opposite end of the shaft 7 internally of the housing, and the opposite side of the differential is connected to an output shaft 20. Mounted on the end of the shaft 20 is an end yoke 21 secured in place by a nut 23 threadedly mounted on the output shaft 20. The input differential includes the usual gearing requirements of an automotive differential, including a differential spider, sprockets and pinions. Differential pinions 26 drive the sprocket 17 and differential pinions 27 on the opposite side drive the output shaft 20. A sliding clutch 30 mounted on the shaft 7 is arranged to engage clutch components mounted on the sprocket 17 for providing drive of the sprocket 17 by the input shaft 7. The clutch is engaged and disengaged by means of a lever arm 33 actuated by a push bar 34 arranged to move the lever bar 33 toward the sprocket and a return spring moves it away from the sprocket 17. At the lower end of the housing another sprocket 35 is mounted on a shaft 36 journalled for rotation in bearings 37 depending from cover plate 38 at one side and in bearings 39 mounted on the cover plate 40 on the other side. A high speed silent chain, only partially shown as chain 43 on the sprocket 17 and a chain 44 on the sprocket 35, is mounted around the sprockets for conjointly rotating the same. The cover 38 is secured to the case by means of bolts 45 and the rear cover is secured to the case by means of bolts 46. A yoke 48 is splined to the shaft 36 and is secured in position by a nut 49. The yoke 48 is arranged to be attached to a propeller shaft which drives a front differential, explained below.

The operation of the chain on the sprockets, of course, wears the parts and on substantial use the chain loosens on the sprockets. The chain may be easily and quickly tightened by mounting the shaft 36 concentrically or offset in the cover 38 and its opposite cover and providing a series of additional bolt holes 50 around the bolt hole circles of the covers, shown in FIG. 2. With the offset shaft, the covers may be turned to move the shaft 36 toward and away from shaft 7 and thereby provide for adjustment of the chain. Both covers must be turned in the same manner and the shaft moved toward or away from shaft 7 to provide for tightening or loosening the chain. In some configurations of the housing both shafts may be mounted concentrically with all the covers to provide adjustment of the chain by rotating all the covers.

A brake mechanism is mounted on shaft 36 opposite the yoke 48, and this includes a rotary drum 55 splined to the shaft and mounted over a brake shoe assembly 56 mounted against rotation on the cover 40. The brake drum is mounted on a flange assembly 51 splined to the shaft 36. The brake assembly 56, of course, includes brake shoes (not shown), and a brake shoe actuator 57 which is controlled by the driver of the vehicle. The mechanism which actuates the brake shoes for operating the brake may be a conventional assembly, either manual or hydraulically actuated. When the brake shoes are actuated, the drum is held tightly against rotation which holds the shaft 36, the chain, the differential 19. A drain plug 60 is provided at the bottom of the case for draining lubricant as desired, and a side pipe plug 61 provides an inspection hole for inspecting the chain in the case.

Lubrication for the transfer case is provided by means of a pressure lubrication system, which includes an inlet 65 on the top of the output shaft and which provides lubricant under pressure for the bearing set 66 on shaft 20. An oil inlet 67 injects lubricant onto the output shaft behind an O-ring seal 68 forcing lubricant into orifice 69 for lubricating the shaft of the differential on which the output shaft 20 revolves and through the passage 70 into lateral passages 71 for lubricating the bushing 18 for the sprocket 17. Lubricant is, also, forced through passage 72 which lubricates the chain and the sprocket as well as the clutch mechanism on the opposite side of the sprocket and including the bearing 8 for the input shaft. Lubricant cascading down along the chain and the case enters a passage 73 on one side and passage 74 on the opposite side to lubricate the bearings for the lower shaft.

For use in a vehicle the transfer case of the invention is mounted on the vehicle frame and an engine 80, FIG. 4, through a transmission 81 drives propeller shaft 82 connected to a transfer case 83, made in accordance to the invention. The output shaft of the transfer case is connected to driven propeller shaft 84 which is connected to a rear differential 85 for driving a first set of rear drive wheels, and an output shaft 86 from this differential 85 is connected to a short propeller shaft 87 for driving a differential 88 on a second set of rear drive wheels. At the forward end of the transfer case, a lower output shaft 90 drives a propeller shaft 91 which drives a differential 92 for a front steerable drive axle. Where a two speed axle is used for both rear axles the device provides for a three speed axle range by use of the two speeds of each axle, thus with both axles in low range there is one speed range, with both axles in high speed there is another range, and with one in low and one in high a third range is provided. This provides a three speed range and where the transmission 81 is a five speed transmission the vehicle will be provided with fifteen speeds. A vehicle with only one rear axle may be provided with three speed ranges by utilizing a two speed front axle as well as a two speed rear axle. The same effect is achieved by selectively using the high and low speed ranges of the axles.

Figure 5:
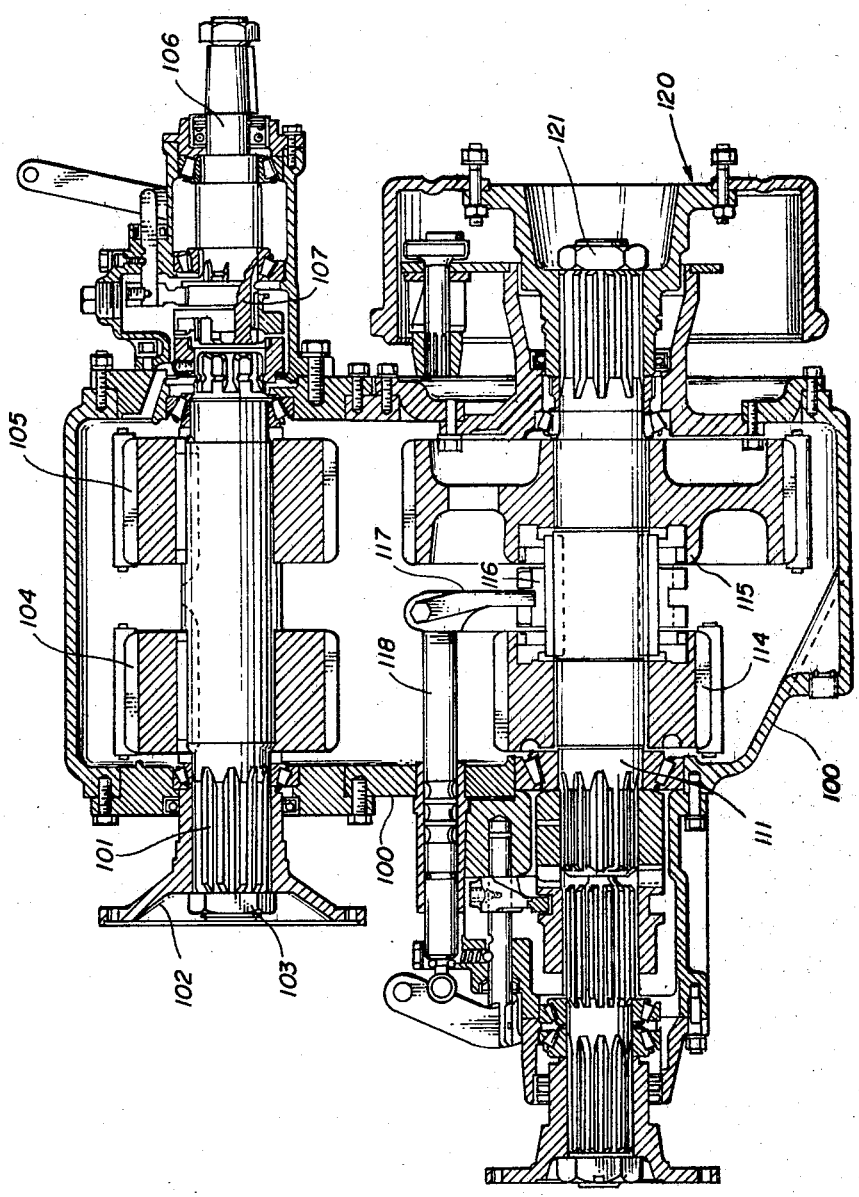
FIG. 5 is a side elevation, cross-sectional view of a modified form of the transfer case, providing two speeds.

A two speed transfer case is readily prepared, according to the invention, by providing two sets of sprockets and two chains in the case, each chain driving a sprocket of different size. As shown in FIG. 5, a case 100 is provided with an input shaft 101 having a yoke 102 splined and secured thereto by means of nut 103. Keyed on the shaft is a sprocket 104 forward of a sprocket 105, also, keyed thereto, leading to an output shaft 106 through a clutch 107. The shaft is suitably mounted in bearings in the case. A lower output shaft 111 is suitably mounted in bearings in a case 100, and a free running sprocket 114 is mounted on a bushing on the shaft directly below the sprocket 104 and a larger sprocket 105 mounted on a bushing for free rotation on the shaft directly below sprocket 105. A chain, not shown completely, is mounted over the sprocket 104 and the lower sprocket 114, and in a similar manner, a chain is passed over sprocket 105 and the lower sprocket 115 to provide rotation for these lower sprockets. Since the lower sprockets 114 and 115 are free on the shaft 111 they will rotate at all times with the shaft 101 by the chains. To provide rotation for the shaft 111 a sliding clutch 116 is splined to the shaft 111 and is movable into engagement with corresponding members on either sprocket so that the driving power is through the chain having its sprocket clutched to the shaft. The sliding clutch member 116 is moved by lever arm 117 which is actuated by connecting rod 118 attached through proper linkage to the cab. Whenever one set of sprockets is driving the output shaft the other set of sprockets is running freely on the output shaft. For example, the transfer case may have a two speed ratio of 1:1 at a high range and a 1:1.92 in the low range. The range, of course, is determined by the ratio of the diameters of the drive to the driven sprockets. A brake assembly shown in general by 120 is mounted on the opposite end of the output shaft and is contained thereon by means of a nut 121. The brake provides a parking brake similar to that explained according to FIGS. 1–3.

Various output shafts may be provided in the case by mounting idlers on the chain and extending the idler shaft through the case either forwardly or rearwardly for additional power outlets from the case. The case is, also, amenable to the clutches which may be mounted on either shaft as desired. Also, various types of braking mechanisms may be provided for the case depending on the desires of the user. One of the most important features of the transfer case of the invention is the ability to change the placement of the output shaft in relation to the input shaft. The case may be pivoted around the input shaft to place the output shaft at any desired position around the circle. Thus, the transfer case, while it is shown in upright position, may be placed in a substantially horizontal position, or any other position dictated by the configuration of the frame of the vehicle in which it is used. This permits extending the output forwardly in an offset position, for example, so that the propeller shaft will not be angled from the case to a front differential.

The chain used in the present invention is high speed silent chain which has become commercially available in recent years. The power requirements are very easily accommodated by the transfer case of the invention, since for greater power requirements that all is necessary is to increase the width of the chain and sprokets, with the remainder of the parts remaining substantially the same if they are capable of carrying the power. Also, as pointed out above the rectangular configuration of the case permits it to be easily adapted to existing vehicle frames without decreasing the clearance between the vehicle and the roadway and without making substantial changes in the frame. Lubrication of the transfer case may be readily achieved by an oil pump attached to a shaft drawing from a reservoir or may be connected with a regular lubrication of internal splash. The two speed transfer case may obviously be provided with an input differential in a manner similar to that of the single chain configuration. By simply lengthening or shortening the chain, the centers of the input and output shafts may be changed to fit any engine-differential system. Also, the transfer case may be connected directly to the engine dispensing with a transmission, particularly with a two-speed transfer case and one or more two-speed axles.

While the invention has been illustrated by reference to specific embodiments there is no intent to limit the spirit or scope of the invention to the precise details so set forth except as defined in the following claims.

I claim:
1. A transfer case for power drives comprising
   (a) a hollow housing having at least one pair of opposed openings adjacent one end thereof;
   (b) a first shaft journalled for rotation adjacent the end of the housing opposite said openings;
   (c) a cover member closing each said opening;
   (d) a second shaft journalled for rotation in said covers and said second shaft being mounted in an offset position to center of the axle of rotation of said covers whereby rotation of the cover members moves said second shaft toward and away from said first shaft;
   (e) an input differential on said first shaft;
   (f) means for attaching one end of said first shaft to an engine drive shaft and means for attaching the output shaft of said differential to a driven shaft, providing a straight through power input and output;
   (g) at least one first sprocket mounted for free rotation on said first shaft and connected to said differential for rotation;
   (h) at least one second sprocket mounted on and rotatable with said second shaft;
   (i) a chain mounted over said at least one first and second sprockets, and
   (j) at least one power take-off means on one end of said second shaft.

2. A transfer case according to claim 1 wherein said housing is a rectangular hollow housing.

3. A transfer case according to claim 2 wherein said housing is formed of at least one channel member with its open side being closed and its ends being closed.

4. A transfer case according to claim 1 wherein each said cover member is circular and is retained on said housing by bolts, and plurality of additional bolt holes are provided in said covers for permitting factional revolution of said covers on said housing.

5. A transfer case according to claim 1 wherein lubrican inlets and passages are provided in said housing for injecting lubricant under pressure into the bearings of said shafts and said sprockets.

6. A transfer case according to claim 5 wherein a passage is provided in said first shaft for forcing lubricant from said passages in said housing to a bushing for said first sprocket.

7. A transfer case according to claim 1 wherein a clutch is mounted on said first shaft cooperable with said first sprocket for selectively locking out said input differential.

8. A transfer case according to claim 1 wherein said second shaft has two power take-off means, and braking means are connected to one said take-off means providing parking brake means.

9. A transfer case according to claim 8 wherein said braking means includes a brake drum rotatably connected to said second shaft and brake hand means are non-rotatably connected to said housing.

References Cited
UNITED STATES PATENTS

| | | | |
|---|---|---|---|
| 2,154,045 | 4/1939 | Herrington | 74—700 |
| 2,399,201 | 4/1946 | Buckendale et al. | 74—700 X |
| 2,768,538 | 10/1956 | Simonds | 74—710.5 |
| 2,962,916 | 12/1960 | Koelsch | 74—710.5 |
| 3,006,216 | 10/1961 | Sisson et al. | 74—665 |
| 3,095,758 | 7/1963 | Bixby | 74—701 |
| 3,099,165 | 7/1963 | Heth et al. | 74—701 X |
| 3,375,737 | 4/1968 | Holtan | 74—710.5 X |

ARTHUR T. McKEON, Primary Examiner

U.S. Cl. X.R.

74—694, 710; 192—4